United States Patent [19]

Guin et al.

[11] Patent Number: 4,934,287
[45] Date of Patent: Jun. 19, 1990

[54] SUBTERRANEOUS INJECTOR

[76] Inventors: Robert D. Guin, Bryant Rd., Rte. 4, Box 422 North, Columbus, Miss. 39702; Percy J. Vaughn, Jr., 5794 Carriage Barn La., Montgomery, Ala. 36116

[21] Appl. No.: 310,668

[22] Filed: Feb. 15, 1989

[51] Int. Cl.$^5$ .............................................. A01C 15/02
[52] U.S. Cl. ........................................ 111/7.1; 47/48.5
[58] Field of Search .................................. 111/7.1–7.4, 111/82, 92, 94, 95, 96, 6, 89; 294/49, 60; 172/371; 47/48.5

[56] References Cited

U.S. PATENT DOCUMENTS

| | | | |
|---|---|---|---|
| 1,771,694 | 7/1930 | Talvitie | 111/92 |
| 2,043,318 | 6/1936 | Conley | 111/7.1 |
| 2,083,153 | 6/1937 | Irish | 111/7.1 |
| 2,242,789 | 5/1941 | McFee | 111/7.1 |
| 3,326,306 | 6/1967 | Weir | 111/7.1 |
| 4,682,550 | 7/1987 | Joy | 111/7.1 |

Primary Examiner—Danton D. DeMille
Attorney, Agent, or Firm—Richard C. Litman

[57] ABSTRACT

A subterraneous treatment apparatus for injecting controlled amounts of fertilizer or other nutrient materials into the soil adjacent the root system of plants. The apparatus includes a closed cylindrical container for the storage of fertilizer and a multi-valve holding chamber assembly consisting of a cylindric holding chamber below the container to receive a measured amount of fertilizer and a terminally disposed upper inlet valve and a lower discharge valve to control the flow of fertilizer therethrough. The apparatus further includes an elongated tube which extends below the holding chamber and is provided with a ground-penetrating section to facilitate insertion into the ground. The multi-valve holding chamber assembly prevents a stream of water from entering the closed container and permits a precise amount of fertilizer to be released into the elongated tube for subterraneous injection to the root zone.

6 Claims, 2 Drawing Sheets

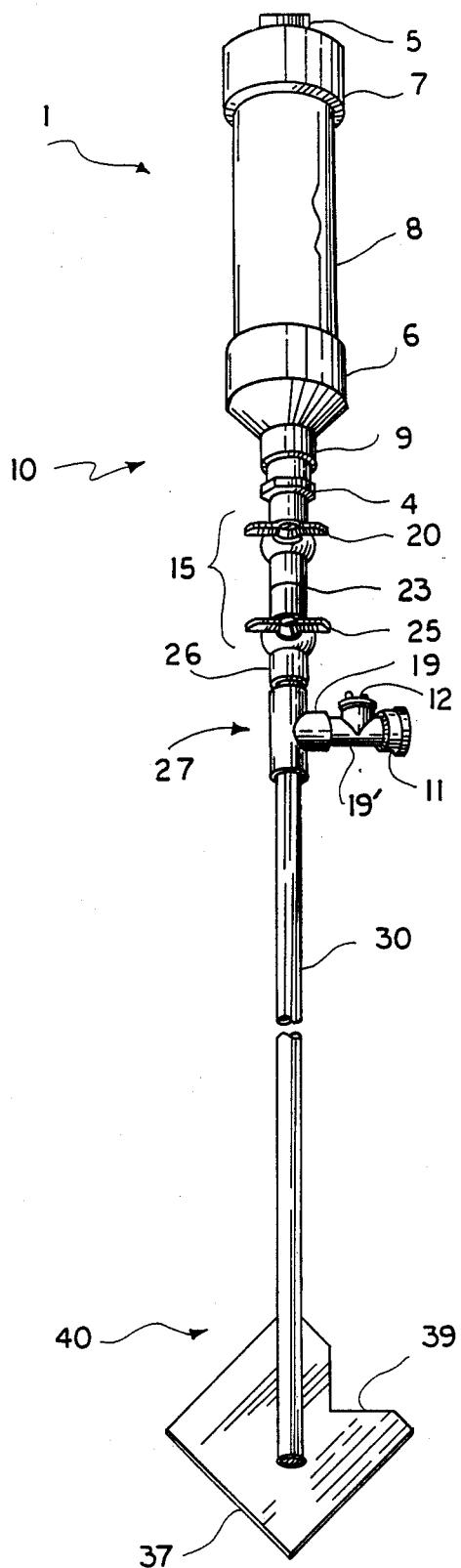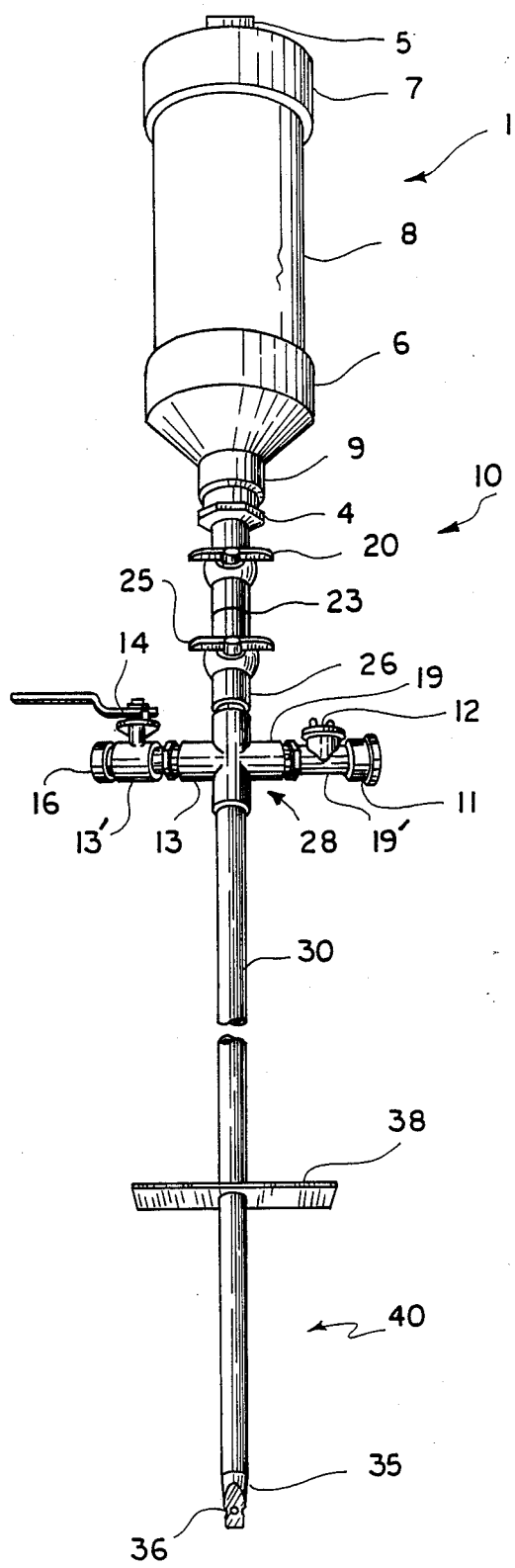
FIG_1
FIG_2

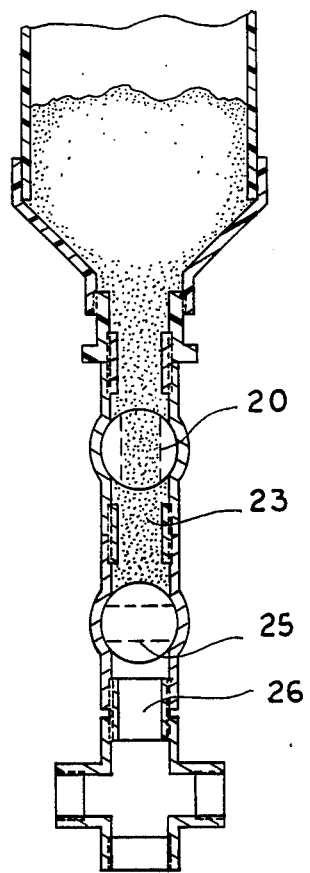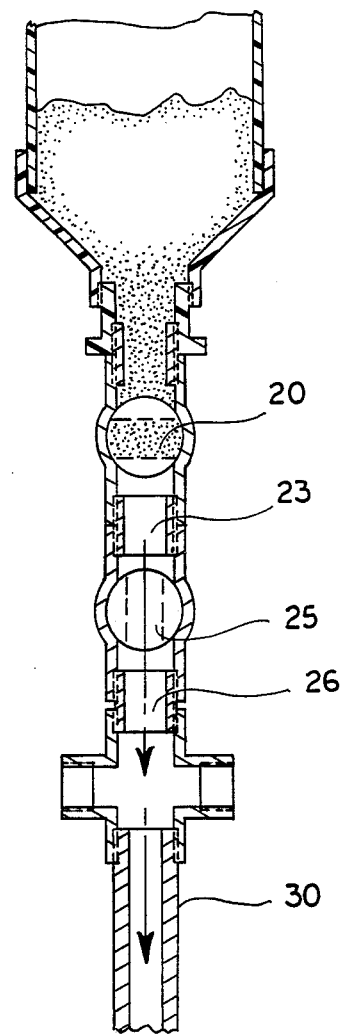
FIG_3
FIG_4

SUBTERRANEOUS INJECTOR

BACKGROUND OF THE INVENTION

1. Field of the Invention

This invention relates generally to an apparatus for injecting fertilizer into the soil below the surface thereof. More particularly, the invention relates to a subterraneous treatment apparatus which is insertable into the ground and is capable of injecting controlled amounts of fertilizer into the soil adjacent the root system of plants.

2. Description of the Prior Art

The prior art has disclosed many appropriate devices capable of supplying beneficial materials such as fertilizers and other chemicals to the roots of various plants. One such device is described in U.S. Pat. No. 2,242,789, issued May 20, 1941 to McFee. This patent discloses an apparatus for injecting pulverized or granular fertilizers into the soil comprising a cylindrical closed container for the fertilizer, a tube having one end formed for insertion into the ground and the other end open and extending through the bottom of the closed container. The apparatus is designed for connection to a hose and is provided with an inlet valve, a by-pass valve and a valve to control the flow of fluid through the tube. The fertilizer held in the closed container is taken in suspension by a stream of water which is then carried into the soil below the surface thereof. Similar devices for underground fertilization of plant roots in which a stream of water is admitted to the container of fertilizer prior to being dispensed below the surface of the soil are described in U.S. Pat. Nos. 3,618,539 and 4,432,291, for example.

The prior art further discloses devices for aerating soil and injecting fertilizer and water to the loosened dirt around the roots of trees and shrubs. U.S. Pat. No. 4,682,550 issued July 28, 1987 to Joy discloses a hand-held device capable of effectively breaking up soil around the roots of trees and plants with compressed air, injecting granular fertilizer into the loosened soil, and injecting water therein to dissolve the fertilizer, all in a single operation. The root treatment device described by Joy includes a cylindrical housing tapered at its lower end and having an open reservoir which contains granular fertilizer at the upper portion. An inner tube extends concentrally through the housing and a circular ground plate is attached at the lower portion of the housing. An air inlet pipe is attached to the upper end of the outer cylindrical housing and a water inlet pipe connects to the inner tube. Despite the recognition by the patentee of the advantages of providing an apparatus that combines aeration and underground fertilization in a single operation, the device described in U.S. Pat. No. 4,682,550 is poorly constructed and inefficient. This patented device requires an auxiliary piece of equipment, such as a pneumatic drill, since no structural means are provided for inserting the device into the ground. Also, the repetitive lifting and falling action of the device during the aeration operation would result in spillage of the granular fertilizer from the open reservoir. Moreover, the prior art apparatus would have to be substantially modified to accommodate liquid fertilizer or other fluid treatment material. In addition, the granular fertilizer employed by Joy is injected in indeterminate amounts as a solid which would result in uneven distribution and varying concentrations around the plant roots.

SUMMARY OF THE INVENTION

Accordingly, it is a primary object of the invention to provide an improved apparatus for injecting fertilizer, water and/or air below the surface of the soil adjacent the root system of plants which is readily insertable into the ground and is capable of more precise control of the injected materials than with known devices of this kind.

It is another object of the present invention to provide a versatile, lightweight subterraneous treatment device which is constructed of interchangeable parts and does not require any complex auxiliary equipment to perform its various operations.

It is a further object of the present invention to provide a complete root treating apparatus which will resist clogging during operation and permits even distribution of premeasured amounts of nutrient materials throughout the entire root zone.

These and other objects are accomplished in accordance with one embodiment of the present invention by providing a subterraneous treatment apparatus including a closed cylindrical container for the storage of fertilizer and a tubular holding chamber extending axially below the container to receive a measured amount of fertilizer, and having a terminally disposed upper inlet valve and a lower discharge valve to control the flow of fertilizer therethrough. The present invention further includes an elongated tube which extends axially below the tubular holding chamber and comprises a ground-penetrating section which contains a pointed tip at its lower end to facilitate insertion into the ground. At the upper end of the elongated tube is laterally attached water and air inlet tubes, and a splash shield is advantageously attached at the lower portion of the elongated tube above the ground-penetrating part of the apparatus.

The ground-insertion assisting tip is provided with at least one orifice disposed diametrally for diverting a fluid laterally of the elongated tube. The lateral water and air inlet tubes are connectable to a water and a compressed air source and include valves for alternately directing water and air to the elongated tube.

An advantageous feature of the present invention is a multi-valve holding chamber assembly which prevents a stream of water from entering the closed container and thereby avoids the unnecessary dilution of unused fertilizer. Also, the multi-valve holding system permits a precise amount of fertilizer to be released into the elongated tube for subterraneous injection into the ground.

The foregoing and other features, advantages and objects of the invention may be more fully appreciated by reference to the following description.

BRIEF DESCRIPTION OF THE DRAWINGS

FIG. 1 is a fragmentary perspective view showing an embodiment of the apparatus according to the present invention.

FIG. 2 is a fragmentary perspective view showing a preferred embodiment of the apparatus according to the present invention.

FIG. 3 is an enlarged, fragmentary sectional view illustrating the two-valve holding chamber assembly in an open-closed configuration.

FIG. 4 is an enlarged, fragmentary sectional view illustrating the two-valve holding chamber assembly in an alternate closed-open configuration.

DESCRIPTION OF THE ILLUSTRATIVE EMBODIMENTS

The root treating apparatus of the present invention, indicated generally as 10 in FIGS. 1 and 2, includes a container or reservoir 1, a multi-valve holding chamber assembly 15, an inlet passage 19 and an elongated tube 30 provided with a ground-penetrating section 40.

The container 1 is substantially cylindrical to store fertilizer in varying quantities for latter use. This container is specially constructed to be closed tightly by means of a screw-in cap (not shown) having a tool-engaging member 5. The container 1 may be made available in one gallon or one-half gallon capacity, for example, and consists of upper head 7, lower head 6 and a cylindrical section of transparent tubing 8 which is permanently sealed between the heads to form a securely closed reservoir. The transparent tubing 8 permits the operator of the apparatus to visually monitor the contents of the reservoir to determine when to refill the container. After continuous operation and numerous applications of fertilizer have been injected into the soil, it is possible to re-charge the container by removing the screw-in cap which is readily accessible at the top side of the apparatus. Upper head 7 includes a circular open upper end consisting of internal threads engageable with outer threads on the depending circumference of the screw-in cap.

The base of lower head 6 tapers to form an open neck 9 which connects to multi-valve holding chamber assembly 15 by coupling means, such as packing gland nut 4. Multi-valve holding chamber 15 comprises at least two valves, an upper valve 20 and a lower valve 25, and a cylindric or tubular holding chamber 23 between the valves to receive a measured amount of fertilizer. The precise volume of cylindric holding chamber 23 is predetermined and may be constructed to vary in capacity to accommodate different soil conditions and various types of plants to be treated.

As best shown in FIG. 3, the cylindric holding chamber 23 receives fertilizer from reservoir 1 by opening upper valve 20 while lower valve 25 is in the closed position. After the holding chamber fills to its predetermined volume, upper valve 20 is closed and the apparatus is loaded for subsequent operation. With the upper valve in the closed position, fertilizer is released from cylindric holding chamber 23 into the upper portion of elongated tube 30 through release passage 26 by opening lower valve 25 as shown in FIG. 4. Multiple two-valve holding chamber systems may be arranged in series to permit the apparatus to be operated in a continuous manner by manipulating the open-close configuration of the respective valves in an alternating fashion.

As can be seen from FIGS. 1 and 2, elongated tube 30 is in axial alignment and open communication with release passage 26 through connecting means, such as T-shaped connector 27 (FIG. 1) or cross-shaped connector 28 (FIG. 2). Connectors 27 and 28 comprise a laterally disposed water inlet passageway 19 openly extending into inlet passage 19'. A valve 12 disposed in inlet passage 19' is provided to control the flow of water through the tube 30. The inlet passage 19' is provided at its end with a suitable coupling 11 for attachment to a hose, such as a conventional garden hose, which may be attached to any suitable source of water supply.

In a preferred embodiment of the present invention as shown in FIG. 2, cross-shaped connector 28 comprises a lateral air inlet passageway 13, in diametrically opposed relationship to water inlet passageway 19. An air inlet passage 13' which extends from passageway 13 contains a valve 14 to control the flow of air to be injected into the ground and is provided at its end with a coupling 16 for attachment to any suitable unit that stores a supply of compressed air. Preferably, the air storage unit is a portable pressure tank that stores a suitable supply of air at a pressure of up to about 400 pounds per square inch and may be used in combination with an air compressor to maintain a certain minimal pressure.

Elongated tube 30 is screw threaded at its upper end into the vertical passageway of T-shaped connector 27 (FIG. 1) or cross-shaped connector 28 (FIG. 2) and is also provided with a ground-penetrating part 40 (FIGS. 1 and 2) at its lower section. Referring first to FIG. 2, ground-penetrating part 40 consists of a centrally apertured tip 35 to facilitate insertion. Tip 35 is replaceably threaded into the lower end of elongated tube 30 and is provided with at least one orifice 36 disposed diametrally to its central aperture (not shown) for diverting a fluid laterally of the elongated tube. A splash shield 38, rigidly attached and position proximate to the upper section of the ground-penetrating part, also facilitates in inserting the apparatus in the ground and particularly serves to stabilize the apparatus during the aeration operation which will be more fully described hereinafter.

An alternative ground-penetrating part 40 is illustrated in FIG. 1 wherein a rectangular-shaped plate 37 is rigidly attached diagonally at the lower end of elongated tube 30. Plate 37 serves as a spade and is provided with a foot-engaging member 39 to facilitate the application of a downward pressure for digging a hole into the ground for inserting the apparatus.

As thus far described, it can be seen that the one-gallon and one-half gallon containers 1 may be interchanged at coupling means 4 to provide a fluid-sealed connection. It should also be noted that the length of elongated tube 30 may vary between about 3–5 feet, preferably 50–55 inches, and its inside diameter may range from about $\frac{1}{4}$–$\frac{3}{4}$ inches depending upon the type of fertilizer to be fed to the plant roots. As will be further appreciated, ground-penetrating section 40 or tip 35 may be provided with a plurality of orifices arranged to prevent clogging and for directing the fluid medium laterally of the elongated tube 30. Centrally apertured tip 35 may be provided with a tapered end and is of a strong durable construction which permits it to be readily inserted into the ground.

The method of using or operating the apparatus 10 is described with reference to FIGS. 1 and 2, wherein fertilizer or other appropriate chemicals are changed into container 1. The fertilizer may be any common plant nutrient or pesticide in liquid, pulverized or granular form. Valves 12, 14 (FIG. 2), 20 and 25 are closed and the screw-in cap (not shown) may be shut by hand or securely tightened by means of tool-engaging member 5 to prevent the passage of extraneous fluids into container 1. The ground-penetrating part 40 of elongated tube 30 is inserted in the ground around the roots of a tree or shrub by pressing with the operator's foot on splash shield 38 (FIG. 2) or member 39 of plate 37 (FIG. 1). Preferably, water inlet valve 12 may be opened and water injected at the surface of the soil to soften the ground and ease penetration of the appropriate section of apparatus 10. The operator may control apparatus 10 during this procedure by grasping the rigidly attached water inlet passage 19' and/or air inlet passage 13' (FIG. 2) which effectively serve as handles.

The method of aerating the soil in accordance with a preferred embodiment of the present invention is described with reference to FIG. 2. Once the root treating apparatus 10 has been changed and inserted into the ground by the procedure described hereinabove, and splash shield 38 is flush with the ground, water inlet valve 12 is closed. The operator then stands on the top of the splash shield 38 with one foot on either side of elongated tube 30 and air inlet valve 14 is opened. Aeration is extremely effective in the breaking up and loosening of compacted soil to allow the formation of a healthy root system. With the ground-penetrating part 40 of the apparatus set at 3 feet and the application of 300 psi of compressed air, six cubic feet of soil is effectively broken up. Aeration is also excellent for drainage of wet soils around root systems.

Next, referring to FIGS. 1 and 2, the operator turns upper valve 20 to the open position while lower valve 25 remains closed. The fertilizer flows from container 1 into cylindrical holding chamber 23 which has a predetermined capacity. After chamber 23 fills to its maximum capacity, as indicated by no further decrease in the level of fertilizer in container 1 as seen through transparent tubing 8, valve 20 is closed. The operator then opens valve 25, causing the fertilizer to fall by gravity or vacuum into the elongated tube 30.

The next step in the procedure is described with reference to FIG. 2. The operator, still standing on splash shield 38, turns off air valve 14 and opens water valve 12. This brings the fertilizer in solution into contact with roots of the tree or shrub and further moistens the soil.

The described apparatus has the advantages that it is capable of handling all types of commercial fertilizers or other beneficial chemicals without waste and the fertilizers are injected into the soil in relatively short operating periods. The apparatus can be easily used by one operator and does not require any auxiliary equipment for inserting it into the ground. Most importantly, the apparatus of the present invention provides an efficient means for injecting a premeasured amount of a beneficial chemical substance around the roots of trees, shrubs or the like.

The foregoing disclosure and description of the invention are illustrative and explanatory thereof, and various changes in the size, shape and materials as well as in the details of the illustrated construction may be made within the scope of the appended claims without departing from the spirit of the invention.

We claim:

1. An apparatus for injecting precise amounts of fertilizer into the soil adjacent the root system of plants comprising, in combination:

a cylindrical container including an upper head, a lower head and a cylindrical section of transparent tubing which is permanently sealed between said heads to form a closed reservoir for the fertilizer, wherein said lower head is tapered to form a neck opening;

a two-valve holding chamber assembly which connects by coupling means to said neck opening at one end and to a release passage at the other end, said two-valve holding chamber assembly consisting of a tubular holding chamber axially aligned with said neck opening, a terminally disposed upper inlet valve and a lower discharge valve to control the flow of a measured amount of the fertilizer therethrough;

an elongated tube having a upper end and a lower end, wherein said elongated tube is in axial alignment and open communication with said release passage through a connector at said upper end and said elongated tube is provided with a ground-penetrating section at said lower end; and an inlet passage laterally disposed on said connector comprising a water inlet passageway or an air inlet passageway in combination with a water inlet passageway.

2. The apparatus according to claim 1, wherein said ground-penetrating section consists of a threaded tip provided with at least one diametrically disposed orifice for diverting a fluid laterally of the elongated tube, and having a rigidly attached splash shield positioned proximate to the upper portion of the ground-penetrating section.

3. The apparatus according to claim 1, wherein said ground-penetrating section consists of a rectangular-shaped plate provided with a foot-engaging member and wherein said rectangular-shaped plate is rigidly attached diagonally at the lower end of said elongated tube.

4. The apparatus according to claim 1, wherein said inlet passage comprises a laterally disposed air inlet passageway in diametrically opposed relationship to a water inlet passageway, wherein said air inlet passageway contains a valve to control the flow of air and is provided at its end with a coupling for attachment to a unit that stores a supply of compressed air, and wherein said water inlet passageway contains a valve to control the flow of water and is provided with a coupling at its end for attachment to a hose.

5. The apparatus according to claim 1, wherein said inlet passage comprises a laterally disposed water inlet passageway containing a valve to control the flow of water and provided with a coupling at its end for attachment to a hose.

6. The apparatus according to claim 1, wherein said cylindrical container includes a screw-in cap and said upper head of the container comprises a circular opening consisting of internal threads which are engageable with outer threads on the depending circumference of said screw-in cap.

* * * * *